United States Patent Office 3,324,071
Patented June 6, 1967

3,324,071
SYNTHETIC LINEAR POLYAMIDES DELUSTERED WITH MODIFIED TITANIUM DIOXIDE DELUSTRANT
Edward K. Skoog, Florham Park, and Carl R. Eckardt, Morris Plains, N.J., assignors to Allied Chemical Corporation, New York, N.Y., a corporation of New York
No Drawing. Filed Apr. 18, 1962, Ser. No. 188,519
4 Claims. (Cl. 260—37)

This invention relates to synthetic linear polyamides delustered by a titanium dioxide delustrant so modified that the stability to light and oxygen of filaments, etc., prepared from the delustered polyamides is greatly improved, while the delustering power of the titanium dioxide remains high the filaments, etc., show very good white color and excellent physical properties.

Finely divided, pigment grade titanium dioxide is the conventionally used material for delustering artificial filaments from synthetic linear polyamides. Its desirable properties for delustrant use include high index of refraction, satisfactory dispersibility, excellent whiteness, and good chemical stability. One disadvantage of its use in polyamides, however, is that the oxygen at the surface of titanium dioxide is activated photochemically by wavelengths of light in a range absorbed by polyamides. Nascent oxygen is formed with energy sufficient to attack the polyamide, causing embrittlement and loss of strength in the polyamide. The titanium dioxide surface can then reabsorb oxygen from the air which can again be photochemically activated; thus the titanium dioxide functions as a catalyst of polyamide degradation by air and light.

A variety of light stabilizers has been proposed to meet the degradation problem, among which manganese compounds have been found particularly effective. These stabilizers are added to the polymer-forming composition or to the finished filament or fabric. The quantities of manganese-based stabilizer which can be used are limited by the tendency of the stabilizers to discolor the polyamides; moreover some compounds are largely removed by processing such as scouring the fibers or fabrics containing the stabilizer. Hence there has been continuing search for ways to improve the effectiveness of these stabilizers and/or avoid discoloration thereby.

We have now discovered that polyamide compositions are effectively delustered by finely divided titanium dioxide upon which manganous hydroxide has been precipitated in amounts between about 0.1 part and about 10 parts by weight of manganese per 100 parts by weight of titanium dioxide; and that these delustered compositions have good color, good permanence of stabilizing effect, and exceptional stability to the degrading effects of light and air. A particular advantage of our delustrant is that it is free of salts. Even small amounts of salts present in a polyamide affect the viscosity of the polyamide such as polycaproamide when it is held in molten state for fabrication into shaped articles; and viscosity changes during fabrication adversely affect the uniformity of the fabricated articles such as filaments obtained.

Our modified titanium dioxide is suitably prepared by slurrying pigment grade titanium dioxide, typically that with anatase crystal form and having average particle diameter of about 0.3 micron, in dilute aqueous acid of pH about 2; mixing a dilute aqueous acid solution, at pH of about 2, of a manganous salt at the desired manganese content with the titanium dioxide slurry; and then adding ammonia to bring the pH to 9–10 and completely precipitate the manganese.

Analysis of samples of the resulting filtered, water washed and dried (110° C.) solids shows that they contain the manganese approximately uniformly distributed upon the titanium dioxide. X-ray examination shows no evidence of crystalline material other than titanium dioxide. It is concluded that the manganous hydroxide precipitate is converted during the drying step or earlier to monohydrated manganese dioxide, $MnO_2 \cdot H_2O$, which is adsorbed to form a surface layer on the titanium dioxide, probably losing additional water of hydration but not all of the water of hydration during the latter stages of drying and/or when polymer containing the delustrant is shaped from a melt as in melt spinning. However, we do not intend to be bound by any mere theories.

Suitably the titanium dioxide delustrant, thus modified, is incorporated in polyamide by dry blending in a ribbon blender with polyamide chips at about 0.01%–5% by weight of modified titanium dioxide based on the polyamide and extruding the chips, thus coated with delustrant, from a melt. In particular the coated chips can be melt extruded to a metering pump, filter pack, and multihole spinneret for production of delustered yarn. Preferred content of delustrant in such yarn is about 0.1–1 part by weight per 100 parts of polyamide, providing about 10–100 parts of manganese by weight per one million parts of polyamide. A particularly suitable polyamide for use in these operations is epsilon-caprolactam polymer (polycaproamide, nylon-6).

The examples below set forth completely specific embodiments of our invention illustrative of the best mode known to us of carrying out the invention; but the examples are illustrative only and are not intended to be limiting.

In the examples, 70 denier/32 filament semidull yarn was prepared as above outlined. Polycaproamide cylindrical pellets about $\frac{1}{16}$ inch in diameter x $\frac{1}{16}$ inch long were dried to less than 0.05% moisture, then blended 2 hours under nitrogen in a ribbon blender with 0.3 percent by weight of the delustrant specified in the table below, whereby a dust-free coating was obtained on the pellets. The pellets were melt spun through a 32-hole spinneret using an extruder for melting and for dispersing the delustrant in the polycaprolactam. The resulting yarn was oriented by drawing on a drawtwister in the conventional manner. Each of the resulting yarns was semidull to dull and white.

The yarns were tested by winding enough yarn to cover the sleeve surface onto aluminum sleeves, under 5–10 grams tension. The sleeves were placed on a test rack and rotated and interchanged periodically for uniform average exposure of 720 ft. candles. The exposure to fluorescent light was for 15 days unless otherwise noted and to the sun lamp was for 10 days. The exposure tests and tests of properties were in an atmosphere of relative humidity 50%±2% and temperature 73° F.±1° F. (about 22°–23° C.).

Details of procedure and results are presented in the table below, wherein "UTS" is ultimate tensile strength in grams per denier (original dimensions) and "UE" is ultimate elongation in percent.

Toughness index, "TI," is given by:

$$TI = \frac{UTS \times UE}{2} \times \frac{1}{100}$$

Modulus of stiffness, "MS," is given by:

$$MS = UTS \times 100/UE$$

TABLE

| | Weight Percent Mn on TiO₂ | P.p.m. Mn in Yarn | | Initial Properties vs. Properties After Exposure | | | | Percent Change of Properties After Exposure | | | |
|---|---|---|---|---|---|---|---|---|---|---|---|
| | | | | UTS | UE | TI | MS | UTS | UE | TI | MS |
| Control | Unmodified TiO₂ | | Initial | 6.7 | 27 | .904 | 24.8 | | | | |
| | | | Fluorescent | 4.4 | 11 | .242 | 40.0 | −34 | −61 | −73 | +61 |
| | | | Sun Lamp | 3.0 | 7 | .105 | 42.8 | −55 | −73 | −88 | +72 |
| Ex. 1 | 0.14 | 4.2 | Initial | 6.6 | 28 | .924 | 23.5 | | | | |
| | | | Fluorescent | 6.0 | 20 | .600 | 30.0 | −9 | −28 | −35 | +28 |
| | | | Sun Lamp | 4.6 | 11 | .253 | 40.9 | −31 | −61 | −73 | +74 |
| Ex. 2 | Ca. 3.3 | Ca. 100 | Initial | 7.0 | 26 | .910 | 26.8 | | | | |
| | | | Fluorescent (13 days) | 6.8 | 24 | .816 | 28.3 | −3 | −9 | −10 | +6 |
| | | | Sun Lamp | 5.8 | 21 | .609 | 27.6 | −17 | −18 | −33 | +3 |
| Comparison¹ | Ca. 3.3 | Ca. 100 | Initial | 6.9 | 28 | .966 | 24.6 | | | | |
| | | | Fluorescent | 6.5 | 25 | .812 | 26.0 | −6 | −12 | −16 | +6 |
| | | | Sun Lamp | 5.6 | 20 | .560 | 28.0 | −19 | −39 | −42 | +14 |

¹ Mn (H₂PO₂)₂ blended by dry coating on polycaproamide pellets containing 0.3% TiO₂; spun as above described.

It will be seen that our compositions provide material from which semidull and dull filaments of excellent physical properties and excellent light stability can be spun. Because the manganese light stabilizer in our compositions is adsorbed upon the titanium dioxide it is resistant to removal in processing of the filaments. Freedom of our compositions from salts eliminates one source of irregularities in the properties of filaments obtained therefrom.

We claim:

1. A delustered, light-stable synthetic linear polyamide composition comprising said polyamide and as delustrant, finely divided titanium dioxide upon which manganese hydroxide has been precipitated in amounts between about 0.1 part and about 10 parts by weight of manganese per 100 parts by weight of titanium dioxide.

2. A drawn nylon filamentary article of composition as defined in claim 1 and containing between about 0.01% and about 5% of said delustrant.

3. Filamentary article as defined in claim 2 wherein said nylon is a polycaproamide, said titanium dioxide is in amounts between about 0.1 part and about 1 part per 100 parts of polycaproamide, said manganese is in amounts between about 10 parts and about 100 parts per million parts of polycaproamide, and the composition is free of salts.

4. Process of delustering and stabilizing against deterioration a synthetic linear polyamide which comprises incorporating, in said polyamide, titanium dioxide delustrant which has been modified by precipitating manganous hydroxide upon the surface of the titanium dioxide.

References Cited

UNITED STATES PATENTS

| | | |
|---|---|---|
| 2,868,663 | 1/1959 | Jarmus et al. |
| 3,002,947 | 10/1961 | Maple. |
| 3,108,091 | 10/1963 | Illing et al. _____ 260—45.75 |

FOREIGN PATENTS 767,897  2/1957  Great Britain.

MORRIS LIEBMAN, *Primary Examiner.*

T. D. KERWIN, A. H. KOECKERT, R. BARON,
*Assistant Examiners.*